United States Patent
Tezuka et al.

(10) Patent No.: US 8,843,286 B2
(45) Date of Patent: Sep. 23, 2014

(54) VEHICLE DRIVING FORCE SUPPRESSION DEVICE

(71) Applicant: Fuji Jukogyo Kabushiki Kaisha, Tokyo (JP)

(72) Inventors: Shunsuke Tezuka, Tokyo (JP); Rikio Kenmochi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/941,324

(22) Filed: Jul. 12, 2013

(65) Prior Publication Data

US 2014/0025267 A1 Jan. 23, 2014

(30) Foreign Application Priority Data

Jul. 18, 2012 (JP) ................. 2012-159707

(51) Int. Cl.
*B60W 30/08* (2012.01)
*B60W 30/18* (2012.01)
*B60T 7/22* (2006.01)
*B60W 10/06* (2006.01)
*G08G 1/16* (2006.01)
*B60W 10/184* (2012.01)
*B60W 50/00* (2006.01)

(52) U.S. Cl.
CPC ............ *G08G 1/16* (2013.01); *B60W 2710/182* (2013.01); *B60W 30/18027* (2013.01); *B60T 7/22* (2013.01); *B60W 2550/10* (2013.01); *B60W 2710/0666* (2013.01); *B60W 10/06* (2013.01); *B60W 2050/0071* (2013.01); *B60W 2520/06* (2013.01); *B60W 2540/10* (2013.01); *B60W 2540/106* (2013.01); *B60W 2550/142* (2013.01); *B60W 2540/16* (2013.01); *B60W 10/184* (2013.01)
USPC ............ 701/51; 701/48; 701/70; 701/78; 701/99; 701/101; 701/13; 701/104; 701/300; 701/301; 701/302

(58) Field of Classification Search
CPC ...................................................... B60W 30/08
See application file for complete search history.

(56) References Cited

U.S. PATENT DOCUMENTS

| | | | | |
|---|---|---|---|---|
| 6,476,731 | B1 * | 11/2002 | Miki et al. ................... | 340/937 |
| 7,328,955 | B2 * | 2/2008 | Tsukasaki ................... | 303/190 |
| 7,424,361 | B2 * | 9/2008 | Masuda et al. .............. | 701/101 |
| 8,489,318 | B2 * | 7/2013 | Reinisch et al. ............ | 701/301 |
| 2007/0219695 | A1 * | 9/2007 | Chiu et al. .................. | 701/51 |
| 2008/0097677 | A1 * | 4/2008 | Kawakami ................... | 701/99 |
| 2010/0023234 | A1 * | 1/2010 | Kameyama .................. | 701/70 |
| 2013/0147953 | A1 * | 6/2013 | Rao et al. .................... | 348/148 |
| 2013/0184979 | A1 * | 7/2013 | Karandikar .................. | 701/301 |

FOREIGN PATENT DOCUMENTS

JP 4697486 B2 6/2011

* cited by examiner

*Primary Examiner* — Jonathan M Dager
(74) *Attorney, Agent, or Firm* — McDermott Will & Emery LLP

(57) ABSTRACT

A vehicle driving force suppression device is provided, and driving force suppression is conducted on the basis of existence of an obstacle which is on the opposite course to the selected shift position. Adding specific conditions related to acceleration pedal depression amount and speed, inclination of the road in the direction which an obstacle exists, or distance to the obstacle, magnitude of driving force suppression is decided.

8 Claims, 7 Drawing Sheets

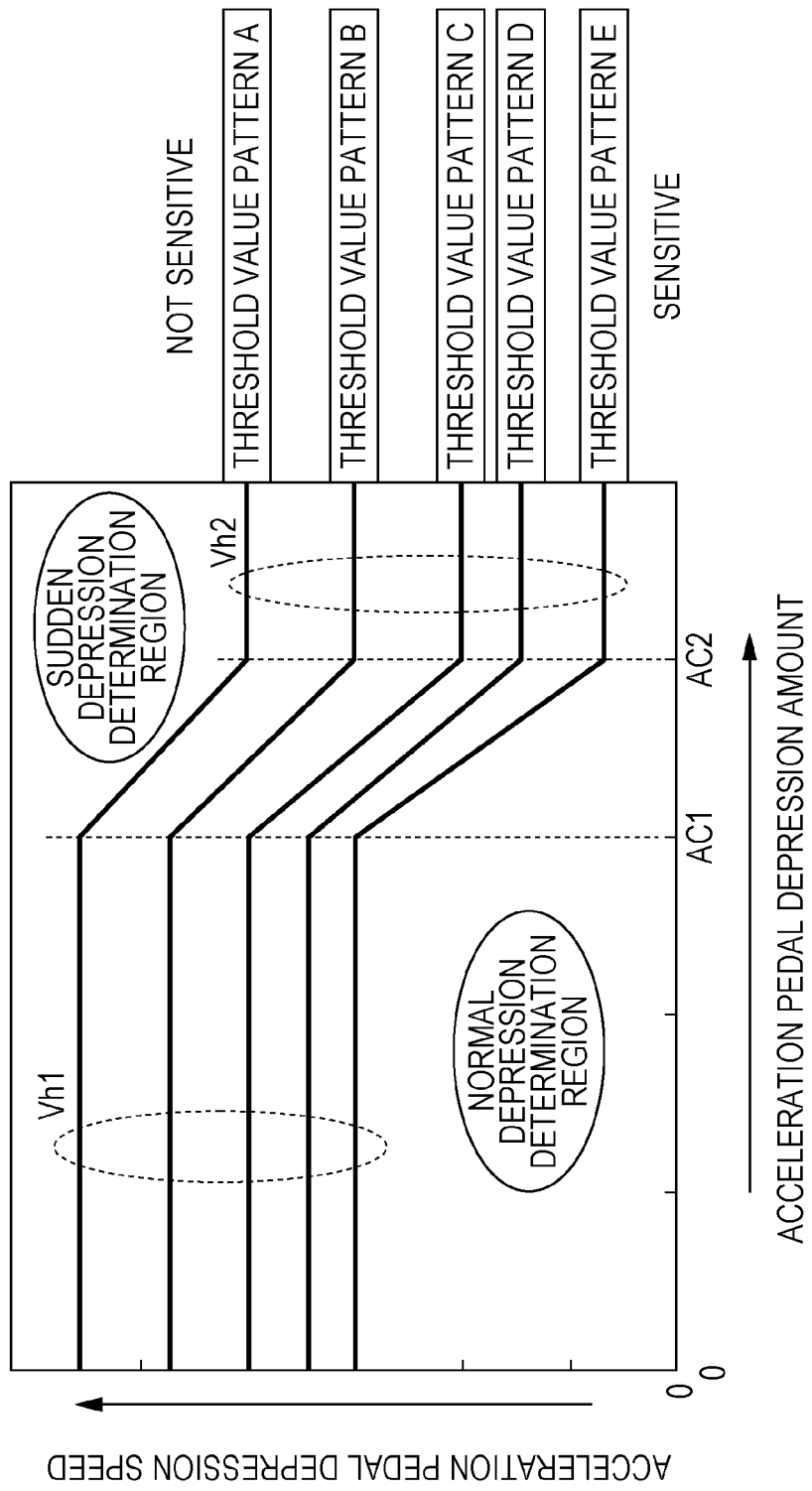

BACKWARD

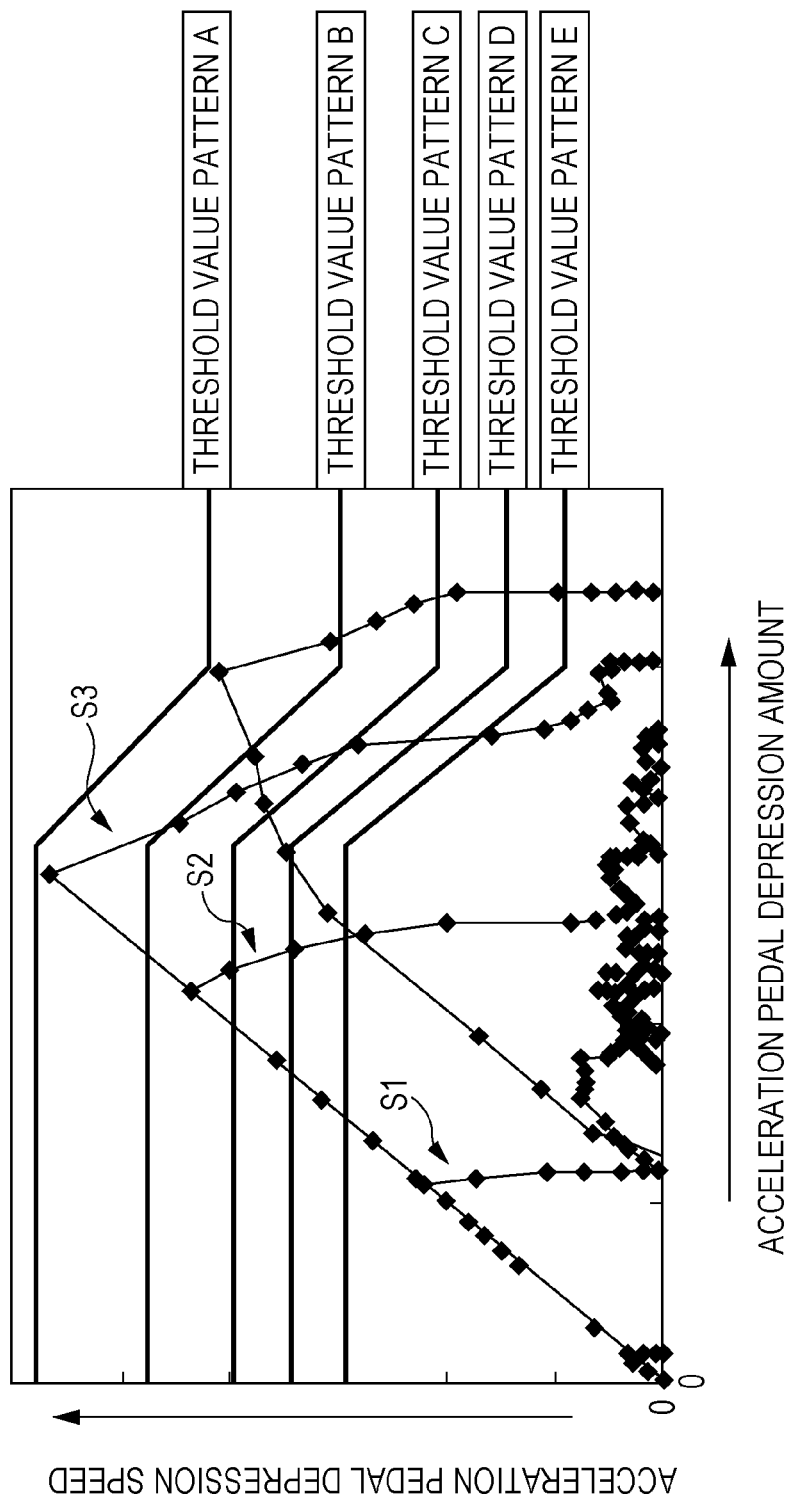

VEHICLE DRIVING FORCE SUPPRESSION DEVICE

CROSS-REFERENCE TO RELATED APPLICATIONS

The present application claims priority from Japanese Patent Application No. 2012-159707 filed on Jul. 18, 2012, the entire contents of which are hereby incorporated by reference.

BACKGROUND OF THE INVENTION

1. Field of the Invention

The present invention relates to a vehicle driving force suppression device for suppressing driving force when a vehicle starts to run, thus preventing an accident due to a driver's erroneous operation.

2. Description of the Related Art

When a vehicle such as an automobile starts to run, a driver may make a mistake such as confusing an acceleration pedal with a brake pedal, which causes a trouble. There have been proposed various techniques to ensure safety against driver's erroneous operations.

For example, Japanese Patent No. 4697486 discloses a technique for identifying an obstacle existing in a starting-off direction and detects, a predetermined erroneous start sign action made towards the object among the actions made by a driver. When the erroneous start sign action is detected, an erroneous start prevention output is performed to prevent the erroneous start.

When the technique disclosed in Japanese Patent No. 4697486 is configured to support both of the forward and backward start of a vehicle, sensors for detecting an obstacle need to be installed at both of the front and the rear of the vehicle, and an erroneous operation is determined based on a profile uniquely predetermined on the basis of a relative speed and a distance from the obstacle. Therefore, a necessary operation may be falsely determined to be an erroneous operation, and this may unnecessarily limit the engine output, and may unnecessarily increase the deceleration force.

BRIEF SUMMARY OF THE INVENTION

The present invention is made in view of the above circumstances, and it is an object of the present invention to provide a vehicle that detects an obstacle using either one of front and rear sensors with a vehicle driving force suppression device that can avoid an accident due to a driver's erroneous operation when the vehicle starts to run, or reduce the damage of the accident to the minimum level, without adding a new sensor to the vehicle.

An aspect of the present invention provides a vehicle driving force suppression device that includes: an object detection unit for detecting an object in front of or at back of a vehicle; a shift position detection unit for detecting a transmission position; a driving force suppression determination unit for determining whether to suppress a vehicle driving force, on the basis of a detection result of the object given by the object detection unit and a detection result of the transmission position given by the shift position detection unit; and a driving force suppression unit for suppressing the vehicle driving force by adjusting at least one of a brake and an engine output. Upon a vehicle starting off if the object detection unit does not detect any object which is an obstacle to driving and which is in front of the vehicle and the shift position detection unit detects that the transmission position is a reverse position, or if the object detection unit does not detect any object which is an obstacle to driving and which is at the back of the vehicle and the shift position detection unit detects that the transmission position is a forward position, the driving force suppression determination unit determines to suppress the vehicle driving force and outputs a command of driving force suppression to the driving force suppression unit, and the driving force suppression unit executes, based on the received command, at least one of restriction of the engine output against the driver's acceleration operation and generation of deceleration force with the brake, thus suppressing the vehicle driving force.

BRIEF DESCRIPTION OF THE SEVERAL VIEWS OF THE DRAWINGS

FIG. 4 is an explanatory diagram illustrating a threshold value pattern for a driving force suppression determination;

FIG. 10 is an explanatory diagram illustrating acceleration operation data and a threshold value pattern when the vehicle runs backward.

DETAILED DESCRIPTION OF THE INVENTION

Hereinafter, an embodiment of the present invention will be described with reference to the drawings.

Figure 1:
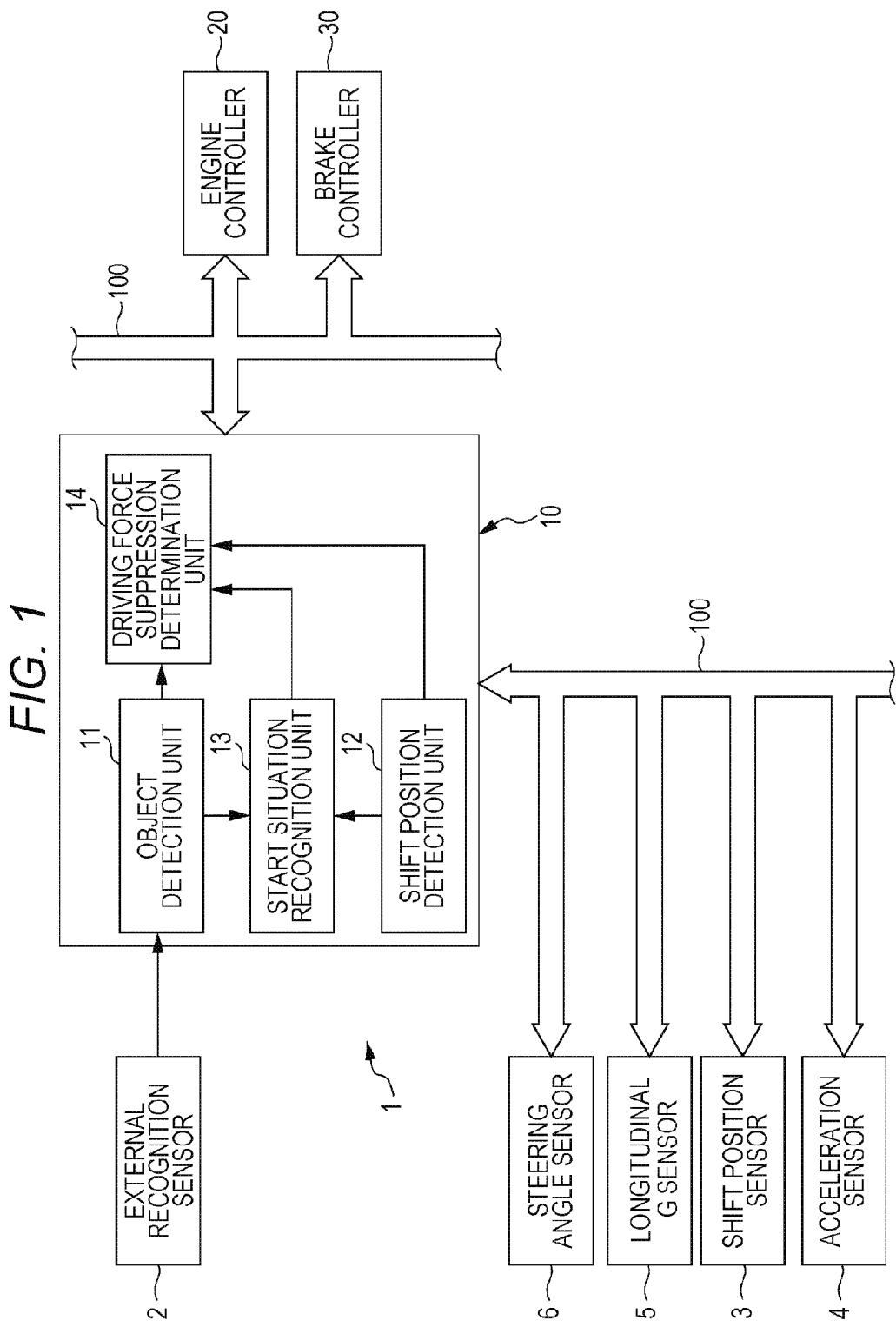
FIG. 1 is an overall configuration diagram illustrating a driving force suppression device.

A driving force suppression device 1 as illustrated in FIG. 1 is installed in a vehicle such as an automobile to suppress the vehicle driving force against driver's erroneous operation when the vehicle starts, improving the active safety by preventing damages of an accident caused by a driver's erroneous operation. More specifically, the driving force suppression device 1 is configured by connecting multiple controller and sensor groups installed in the vehicle with a communication line. In the present embodiment, the driving force suppression device 1 includes a central control device 10 having an external recognition sensor 2 for recognizing the environment outside of the vehicle which is connected to other sensor groups, an engine controller 20, a brake controller 30, and the like via a CAN (Controller Area Network) communication bus 100.

The central control device 10 is a part of a collision prevention system for detecting an obstacle to activate an automatic brake and a warning to the driver. The central control device 10 includes an object detection unit 11, a shift position detection unit 12, a starting-off situation recognition unit 13, and a driving force suppression determination unit 14 for driving force suppression. A determination result of the driving force suppression determination unit 14 is output to the CAN communication bus 100 as a control command for the engine controller 20 and the brake controller 30 serving as a driving force suppression unit, and the vehicle driving force is suppressed by executing at least one of restriction of the engine output and generation of deceleration force with an automatic brake. Accordingly, should the driver make a mistake in the driving operation, an accident can be avoided in advance.

The object detection unit 11 has a function of detecting an object existing at the front or rear of the vehicle using the external recognition sensor 2, and detects an object which is an obstacle to driving. The external recognition sensor 2 may be, e.g., a laser radar and a camera for detecting an object at the front of the vehicle and a camera and an ultrasonic wave sensor for detecting an object at the rear of the vehicle. The object detection unit 11 of this driving force suppression device 1 is either one of a forward monitoring device in which the front side of the vehicle is the detection range for objects existing around the vehicle and a rear monitoring device in which the rear side of the vehicle is the detection range for objects existing around the vehicle. In the present embodiment, the object detection unit 1 of this driving force suppression device 1 detects not only whether or not there is an object which is an obstacle to driving but also the distance from the vehicle to the object.

The shift position detection unit 12 checks whether the transmission position is a forward position or a reverse position when the vehicle starts to run, on the basis of a signal from the shift position sensor 3 for detecting the transmission position, and recognizes whether the vehicle starts to run forward or backward.

The start situation recognition unit 13 recognizes the situation of the vehicle when the vehicle starts to run, on the basis of information given by the object detection unit 11, information given by the shift position detection unit 12, and information given by various kinds of sensors provided in the vehicle. The sensors for obtaining information given to the starting-off situation recognition unit 13 include an acceleration sensor 4 for detecting the acceleration pedal depression amount, a longitudinal G sensor 5 for detecting the degree of the longitudinal acceleration of the vehicle, a steering angle sensor 6 for detecting the angle of steering wheel, and the like. The information given by each sensor is received by the start situation recognition unit 12 via the CAN communication bus 100.

The situations recognized by the start situation recognition unit 13 when the vehicle starts to run mainly include the situations (J1) to (J4) shown below.

(J1) Acceleration Pedal Depression Amount and Acceleration Pedal Depression Speed The acceleration pedal depression amount by the driver is detected on the basis of a signal from the acceleration sensor 4, and the acceleration pedal depression speed is calculated from change in the acceleration pedal depression amount in a predetermined period of time, thus the situation at the starting-off of the vehicle due to driver's acceleration operation is recognized. As explained later, the driving force suppression determination unit 14 compared the acceleration pedal depression speed at this occasion with a predetermined threshold value to determine whether to suppress the driving force or not.

(J2) Road Surface Slope

The longitudinal G sensor 5 calculates the road surface slope from a detected gravitational acceleration in accordance with the vehicle pitch angle, and recognizes whether the vehicle starts from the stopped state on the road surface ascending to the front side or the vehicle starts from the stopped state on the road surface descending to the front side.

(J3) Absence/Presence of Continuous Three-Dimensional Object at a Side of the Vehicle A determination is made on the basis of the information about the object detected by the object detection unit 11 as to whether the vehicle is under a situation where there is a continuous structure such as a guardrail or a curb extending to the front side or the rear side along a side of the vehicle.

(J4) Steering Wheel Angle and Vehicle Running Path

A determination is made on the basis of a signal from the steering angle sensor 6 as to whether the vehicle is steered with a predetermined steering wheel angle or more when the vehicle starts to run, and the path in which the vehicle runs after the starting-off is estimated on the basis of the detected steering wheel angle. In particular, this estimation of the path the vehicle runs is mainly done under a situation where the vehicle starts to run backward when there are continuous structural objects such as guardrail or curb extending to the rear side along a side of the vehicle.

The driving force suppression determination unit 14 determines whether to suppress the vehicle driving force basically on the basis of determination condition based on information given by the object detection unit 11 and information given by the shift position detection unit 12, and when the driving force suppression determination unit 14 determines to suppress the driving force, the driving force suppression determination unit 14 outputs both of or either one of a command for restricting the degree of opening of the throttle to the engine controller 20 and a command for increasing the brake pressure to the brake controller 30, thus reducing the vehicle driving force than that in normal circumstances. Further, in the present embodiment, in addition to the determination condition based on the information given by the object detection unit 11 and the shift position detection unit 12, the condition based on information given by the start situation recognition unit 13 is added as a determination condition of the driving force suppression.

More specifically, when the object detection unit 11 is a device for monitoring the front side of the vehicle and detecting an object which is an obstacle to driving, the vehicle driving force is determined to be suppressed if the following condition is satisfied: the condition in which no obstacle is detected in front of the vehicle and the condition that the shift position detection unit 12 detects that the transmission position is the reverse position when the vehicle starts to run. On the other hand, when the object detection unit 11 is a device for monitoring the back side of the vehicle and detecting an object which is an obstacle to driving, the vehicle driving force is determined to be suppressed if the following condition is satisfied: the condition in which no obstacle is detected at the back of the vehicle and the condition that the shift position detection unit 12 detects that the transmission position is the forward position when the vehicle starts to run.

Figure 2:
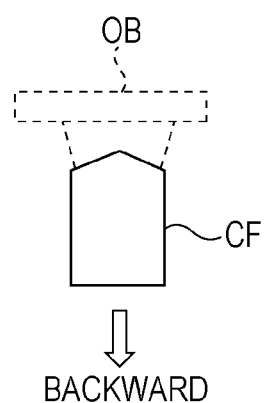
FIG. 2 is an explanatory diagram illustrating a situation when a vehicle having a forward monitoring function starts to run.
Figure 3:
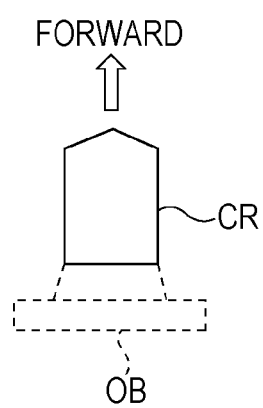
FIG. 3 is an explanatory diagram illustrating situation when a vehicle having a rear monitoring function starts to run.

For example, as illustrated in FIG. 2, when the driver starts to drive backward even if no obstacle OB is detected (no obstacle OB exists) in front of the vehicle CF having the forward monitoring function, or as illustrated in FIG. 3, when the driver starts to drive forward even if no obstacle OB is detected (no obstacle OB exists) at the back of the vehicle CF having the rear monitoring function, the driving force is reduced compared to normal circumstances, so that the accident can be avoided or the damage of the accident can be reduced to the minimum level even if the vehicle starts to run by mistake due to driver's erroneous operation.

In this case, in order to more reliably avoid an unnecessary reduction of the driving force, it is desirable to add the condition of the acceleration pedal depression speed based on the information given by the start situation recognition unit 13, in addition to the determination condition for the case where the obstacle is not detected. This condition of the acceleration pedal depression speed is a condition for determining whether or not the driver's acceleration operation is rapid pressing due to an erroneous operation, and is an AND condition which is added to the determination condition for the case where the obstacle is not detected, but the embodiment is not limited thereto. As explained below, it is also used as an AND condition which is added to the determination condition for the case where an obstacle is detected.

More specifically, when the determination condition for driving force suppression for the case where the obstacle is not detected or when the determination condition for driving force suppression for the case where the obstacle is detected are established, the acceleration pedal depression speed by the driver's operation is compared with a threshold value that is made into a pattern in accordance with the acceleration pedal depression amount. When the acceleration pedal depression speed by the driver is determined to be equal to or more than the threshold value, the driving force is determined to be suppressed.

The threshold value pattern of the acceleration pedal depression speed is set such that, for example, as illustrated in FIG. 4, the threshold value decreases as the acceleration pedal depression amount increases. In the example of threshold value pattern as illustrated in FIG. 4, when the acceleration pedal depression amount is less than the first acceleration pedal depression amount AC1 (for example, 60%), a constant first acceleration pedal depression speed Vh1 is adopted as the threshold value, and when the acceleration pedal depression amount is between the second acceleration pedal depression amount AC2 (for example, 80%), which is more than the first acceleration pedal depression amount AC1, and the full throttle, a constant second acceleration pedal depression speed Vh2, which is less than the first acceleration pedal depression speed Vh1, is adopted as the threshold value. Between the first acceleration pedal depression amount AC1 and the second acceleration pedal depression amount AC2, the threshold value is an acceleration pedal depression speed that linearly decreases from the first acceleration pedal depression speed Vh1 to the second acceleration pedal depression speed Vh2. It should be noted that the acceleration pedal depression speed has positive and negative signs such that the depressed side is denoted as plus and the non-depressed side is denoted as minus.

Further, this threshold value pattern is selected adaptively from among multiple threshold value patterns A, B, C, D and E as illustrated in FIG. 4 as an example, on the basis of the obstacles, the road surface slope, side structure (steering wheel angle) recognized by the start situation recognition unit 13. More specifically, the threshold value for determining sudden depressing of the accelerator pedal is variable on the basis of the situation when the vehicle starts to run, and therefore, a sudden depressing operation of the accelerator pedal which the driver makes from necessity depending on the situation is not falsely determined to be driver's erroneous operation, and therefore, this can prevent the vehicle control system from falsely intervening the driving force suppression.

For example, as shown in (1) to (5) below, the threshold value patterns A to E illustrated in FIG. 4 as an example are set in accordance with situations such as the presence/absence of an obstacle, the degree of the road surface slope, and the presence/absence of a side s, and the size of the threshold value satisfies the relationship A>B>C>D>E.

|  | obstacle | road surface slope | side structural object | threshold value pattern |
|---|---|---|---|---|
| (1) | present (close) | steep slope descending forward (steep slope ascending forward) | none | A |
| (2) | present | slope descending forward (slope ascending forward) | none | B |
| (3) | present | flat | none | C |
| (4) | none | flat | present | D |
| (5) | none | flat | none | E |

Figure 5A:
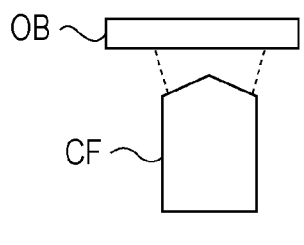
FIGS. 5A and 5B are explanatory diagrams illustrating starting-off situations at a road surface slope descending toward the front side.
Figure 5B:
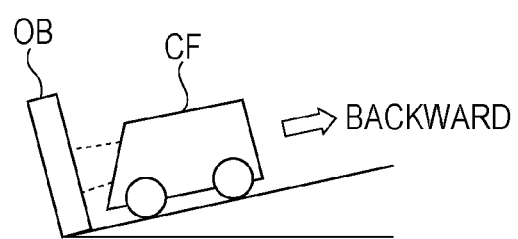

If the vehicle only has a function of the forward monitoring, the threshold value patterns A and B in (1) and (2) correspond to an situation where an obstacle OB such as a wall is detected in front of the vehicle CF as illustrated in FIG. 5A, and, as illustrated in FIG. 5B, the vehicle CF may collide with the obstacle when the vehicle CF rolls forward on the road surface which is a slope descending to the front side. Under such a situation, the vehicle CF climbs the slope backward on the inclined road surface which descends to the front side of the vehicle CF. In order to prevent the vehicle CF from rolling forward due to the gravity and colliding with the obstacle OB, it is necessary for the driver to press the accelerator pedal quickly and deeply.

Figure 6A:
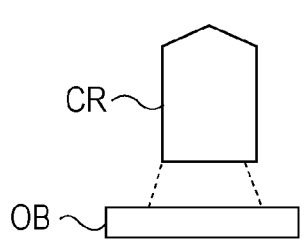
FIGS. 6A and 6B are explanatory diagrams illustrating starting-off situations at a road surface slope ascending toward the front side.
Figure 6B:
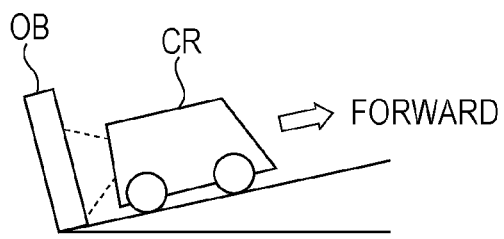

This is also applicable to a vehicle that does not have a function of forward monitoring but only has the function of rear monitoring. When an obstacle OB such as a wall is detected at the rear of the vehicle CR as illustrated in FIG. 6A and the vehicle is on the road surface which is ascending to the front side as illustrated in FIG. 6B, the vehicle CR may roll backward and collide with the obstacle OB when the vehicle CR starts to run forward on the inclined road surface which is ascending to the front side. In order to prevent collision with the obstacle at the rear side, it is necessary for the driver to press the accelerator pedal quickly and deeply also in this case.

Therefore, in such a situation, the determination threshold value for determining sudden depressing of the accelerator pedal is set at a high level, and the determination sensitivity of the driving force suppression is set not strictly, thus avoiding unnecessary driving force suppression based on false determination. At this occasion, when the distance from the obstacle in front of (at the back of) the vehicle is closer, or when the slope which is descending to the front side (ascending to the front side) is steeper, then the threshold value for determining sudden depressing of the accelerator pedal is set at a high level (not sensitive), which can appropriately prevent false intervention. The threshold value pattern A of (1), in which the distance between the vehicle and the obstacle is closer and the inclination of the slope which is descending to the front side (ascending to the front side) is steeper, generally has larger threshold values compared to the threshold value pattern B of (2).

Figure 7:
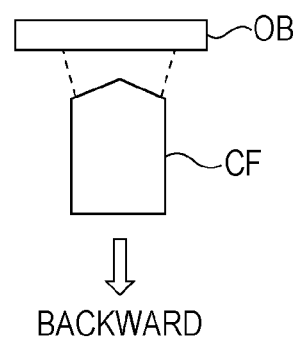
FIG. 7 is an explanatory diagram illustrating a starting-off situation when an obstacle is detected.

The situation corresponding to the threshold value pattern C of (3) will be explained below using a case of forward monitoring. As illustrated in FIG. 7, in this situation, an obstacle OB such as a wall is detected in front of the vehicle CF, but the road surface is flat. In such a situation, there is no option but to start to drive backward, but there may be an obstacle at the back side. Therefore, with a pattern in which threshold values are slightly smaller than the threshold values of the threshold value pattern B, starting-off of the vehicle due to a sudden acceleration operation is suppressed. This is also applicable to a case where an obstacle is detected at the back of the vehicle with only the function of rear monitoring, and when the road surface is flat and the vehicle starts to drive forward, the threshold value pattern C is used to suppress starting-off of the vehicle due to a sudden acceleration operation, whereby occurrence of an accident due to driver's carelessness can be prevented.

In the situation of (3), the determination threshold value for determining sudden depressing of the accelerator pedal may be set at a relatively higher level as the distance between the vehicle and the obstacle is closer.

Figure 8A:
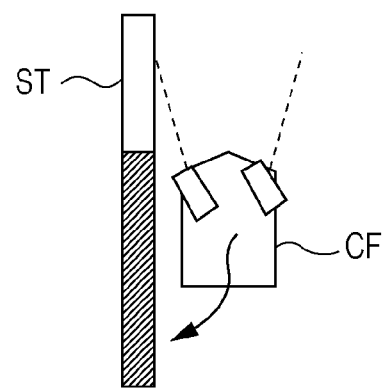
FIGS. 8A and 8B are explanatory diagrams illustrating a starting situation when a structure is detected on a side of the vehicle.
Figure 8B:
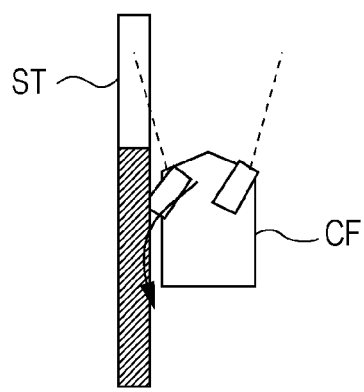

The situation corresponding to the threshold value pattern D of (4) will be explained below using a case of forward monitoring. As illustrated in FIGS. 8A and 8B, in this situation, a continuous structure ST is detected along the front side of the vehicle CF. Such side structure often extends at the side of the vehicle to the rear of the vehicle, like a guardrail and a curb. Therefore, when the vehicle moves backward while the steering wheel is steered to a steering wheel angle equal to or more than a certain level, the rear portion of the vehicle CF may come into contact with the structure ST as illustrated in FIG. 8A, or the side portion of the vehicle CF may come into contact with the structure ST as illustrated in FIG. 8B.

This is also applicable to a case where a continuous structure along the side of the vehicle to the rear of the vehicle is detected with only the function of rear monitoring. In such a case, when the driver starts the vehicle to the front side without noticing that the steering wheel is steered to the steering wheel angle equal to or more than the certain level, the front portion of the vehicle may come into contact with the structural object.

Therefore, when the steering wheel angle (absolute value) is equal to or more than the certain steering wheel angle, the determination threshold value for determining sudden depressing of the accelerator pedal is set at a low level (sensitively), thus actively achieving the effect of avoiding accidents. The certain steering wheel angle at this occasion is a value obtained by estimating the path in which the vehicle may run after the starting-off on the basis of the signal given by the steering angle sensor 6. The steering wheel angle is calculated from the result of the estimation, with which the vehicle is determined to come into contact with a side structure when the current steering wheel angle is maintained.

The situation corresponding to the threshold value pattern E of (5) is produced by adding the condition of the acceleration pedal depression speed to the situation of FIGS. 2 and 3 explained above. More specifically, when no obstacle is detected in front of the vehicle having the forward monitoring function but the driver tries to start the vehicle backward (see FIG. 2), or when no obstacle is detected in at the back of the vehicle having the rear monitoring function but the driver tries to start the vehicle forward (see FIG. 3), the driving force is not immediately reduced, and the state of the driver's acceleration operation is further checked. Then, only after the acceleration pedal depression speed by the driver is more than the threshold value pattern E, the driving force is reduced.

Compared to the threshold value patterns A to D, the threshold value pattern E corresponding to such a situation has the smallest determination threshold value for determining sudden depressing of the accelerator pedal, so that not only the damage of the accident caused by the driver's erroneous operation can be avoided but also unnecessary suppression of the driving force can be avoided.

Figure 9:
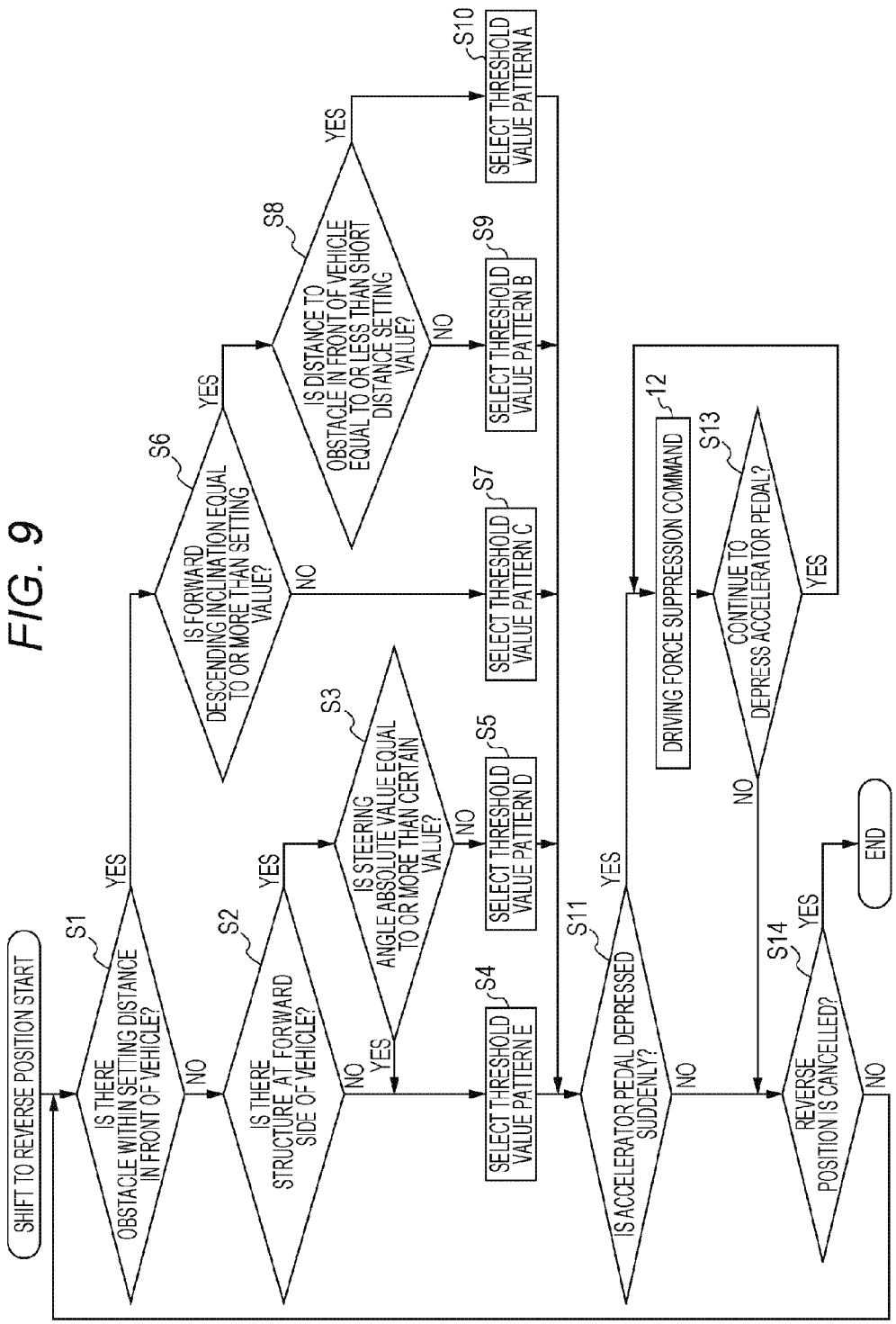
FIG. 9 is a flowchart illustrating driving force suppression processing.

The functions concerning the driving force suppression explained above are achieved with program processing such as driving force suppression processing with forward monitoring as illustrated in FIG. 9. This driving force suppression processing will be explained below using driving force suppression processing with forward monitoring of FIG. 9.

The driving force suppression processing of FIG. 9 is activated when the driver activates the engine to start the vehicle and it is detected that the transmission position is shifted to reverse position. When this processing is activated, a determination is made in the first step S1 as to whether there is an obstacle (whether an obstacle is detected) within a forward setting distance (e.g., 5 m).

When no obstacle is determined to exist in front as a result of step S1, then a further determination is made in step S2 as to whether there is a structure at forward a side of the vehicle. When it is determined that there is no structure at a forward side of the vehicle, step S4 is performed after step S2, and the threshold value pattern E is selected. When it is determined that there is a structure at forward a side of the vehicle, step S3 is performed after step S2, and a determination is made as to whether the absolute value of the steering angle is equal to or more than a certain value (for example, 360 degrees). Then, when the steering angle absolute value is equal to or more than the certain value, the threshold value pattern E is selected in step S4, and when the steering angle absolute value is less than the certain value, the threshold value pattern D is selected in step S5.

On the other hand, when an obstacle is determined to exist in front in step S1, step S6 is performed after step S1, and a determination is made as to whether the road surface slope is of an inclination equal to or more than a forward descending setting value (for example, 8% or more). Then, when the forward descending inclination is less than the setting value, the threshold value pattern C is selected in step S7. When the forward descending inclination is equal to or more than the setting value, a further determination is made in step S8 as to whether the distance to the obstacle in front of the vehicle is equal to or less than a short distance setting value (for example, 1 m). When the distance to the obstacle in front of the vehicle is more than the short distance setting value, step S9 is performed after step S8, and the threshold value pattern B is selected. When the distance to the obstacle in front of the vehicle is equal to or less than the short distance setting value, step S10 is performed after step S8, and the threshold value pattern A is selected.

After the threshold value patterns is selected in any one of steps S4, S5, S7, S9 and S10, then step S11 is subsequently performed, and using the selected threshold value pattern, a determination is made as to whether the driver's acceleration operation data (the acceleration pedal depression speed) fall into a sudden accelerator pedal depression determination region equal to or more than a threshold value.

Then, when the driver's acceleration operation data fall into the sudden accelerator pedal depression determination region, the driver's acceleration operation is determined to be an erroneous operation caused by driver's stepping on a different pedal by mistake, and step S12 is subsequently performed where a command of driving force suppression with the engine controller 20 and the brake controller 30 is sent. The suppression of the driving force is executed as long as the accelerator pedal is determined to be continuously depressed in step S13, and when the accelerator pedal is no longer depressed, step S14 is subsequently performed.

On the other hand, when the driver's acceleration operation data do not fall into the sudden accelerator pedal depression determination region in step S11, the degree of opening of the throttle which is approximately same as that of a normal vehicle is adopted and the control intervention is not performed. Then, in step S14, a determination is made as to whether the reverse position is cancelled and the vehicle is in the normal cruising mode. When the reverse position is not cancelled, step S1 is performed again to repeat the above processing.

FIG. 10 illustrates data in which a driver performs an operation without stepping on the acceleration pedal by mistake when the vehicle moves backward on an inclination road surface descending to the front side of the vehicle when there is an obstacle in front of the vehicle. When there is an obstacle in front of the vehicle on the inclination road surface descending to the front side of the vehicle, the driver is not allowed to roll the vehicle backward during climbing the slope in the reverse position, and in such a situation, the acceleration pedal depression amount and the depression speed may be high because the driver needs to do so, which is not a mistake of stepping on a wrong pedal, and as illustrated by S1, S2 and S3 in the figure, the closer the distance between the vehicle and the obstacle in front of the vehicle is, the higher both of the acceleration pedal depression amount and the depressing speed are.

In such a situation, it is not preferable to falsely recognize that the driver is stepping on the accelerator pedal by mistake and accordingly to restrict the engine output and control the brake. Therefore, an optimum threshold value pattern is selected and applied from among the threshold value patterns A to E in accordance with the road surface slope and the distance to the obstacle in front of the vehicle as described above, so that it is possible to prevent unnecessary suppression of the driving force by avoiding falsely determining that the driver is stepping on a wrong pedal by mistake.

ここから 047In contrast to the driving force suppression processing with the forward monitoring as described above, driving force suppression processing with rear monitoring is activated when the driver activates the engine to start the vehicle and it is detected that the transmission position is shifted to the forward position, and the processing is executed until the vehicle goes into the normal cruising mode. The driving force suppression processing with the rear monitoring is basically same as the driving force suppression processing with the forward monitoring, but the same processing is performed with regard to the obstacle and the side structure while the "in front of the vehicle" is replaced with "at the back of the vehicle".

More specifically, the obstacle in front of the vehicle in step S1 of the forward monitoring, the structure at a forward side of the vehicle in step S2, the inclination descending to the front side of the vehicle in step S6, and the distance to the obstacle in front of the vehicle in step S8 are respectively replaced with the obstacle at the back of the vehicle, the structure at a side of the vehicle at the back of the vehicle, the inclination ascending to the front side of the vehicle, and the distance to the obstacle at the back of the vehicle, in the driving force suppression processing with the rear monitoring.

As described above, in the present embodiment, when no obstacle is detected in front of the vehicle and it is detected that the transmission position is the reverse position when the vehicle starts to run, or when no obstacle is detected at the back of the vehicle and it is detected that the transmission position is the forward position, the driving force is reduced compared to the normal circumstances, whereby, should the vehicle is started by driver's erroneous operation, an accident can be avoided or the damage of the accident can be reduced to the minimum level. In addition, the sensors for avoiding a collision which are already installed on the vehicle are used to make the determination, and therefore, it is not necessary to add new sensors, and the driving force can be suppressed easily at a low cost in an effective manner.

The accelerator pedal depression state is added to the determination condition for determining the driving force suppression, and the threshold value is changed in accordance with the situation when the vehicle starts, so that the driver's accelerator pedal depression operation from necessity depending on the situation, is not falsely determined to be erroneous operation. Therefore, not only the damage of the accident caused by the driver's erroneous operation can be avoided but also unnecessary suppression of the driving force can be avoided.

The invention claimed is:

1. A vehicle driving force suppression device comprising:
   an object detection unit for detecting an object existing only in front of a vehicle;
   a shift position detection unit for detecting a transmission position;
   a driving force suppression determination unit for determining whether to suppress a vehicle driving force, on the basis of a detection result of the object given by the object detection unit and a detection result of the transmission position given by the shift position detection unit; and
   a driving force suppression unit for suppressing the vehicle driving force by adjusting at least one of a brake and an engine output,
   wherein, upon a vehicle starting off, if the object detection unit does not detect any object which is an obstacle to driving and which is in front of the vehicle and the shift position detection unit detects that the transmission position is a reverse position, the driving force suppression determination unit determines to suppress the vehicle driving force and outputs a command of driving force suppression to the driving force suppression unit; and
   wherein the driving force suppression unit receives the command from the driving force suppression determination unit, and executes at least one of restriction of the engine output against the driver's acceleration operation and generation of deceleration force with the brake, thus suppressing the vehicle driving force.

2. The vehicle driving force suppression device according to claim 1, wherein the driving force suppression determination unit adds, to a determination condition of the driving force suppression, a condition that an acceleration pedal depression speed by a driver is equal to or more than a threshold value made into a pattern in accordance with an acceleration pedal depression amount.

3. A vehicle driving force suppression device comprising:
   an object detection unit for detecting an object existing in front of or at back of a vehicle;
   a shift position detection unit for detecting a transmission position;
   a driving force suppression determination unit for determining whether to suppress a vehicle driving force, on the basis of a detection result of the object given by the object detection unit and a detection result of the transmission position given by the shift position detection unit; and
   a driving force suppression unit for suppressing the vehicle driving force by adjusting at least one of a brake and an engine output, wherein
   upon a vehicle starting off, if the object detection unit does not detect any object which is an obstacle to driving and which is in front of the vehicle and the shift position detection unit detects that the transmission position is a reverse position, or if the object detection unit does not detect any object which is an obstacle to driving and which is at the back of the vehicle and the shift position detection unit detects that the transmission position is a forward position, the driving force suppression determination unit determines to suppress the vehicle driving force and outputs a command of driving force suppression to the driving force suppression unit, the driving force suppression unit receives the command from the driving force suppression determination unit, and executes at least one of restriction of the engine output against the driver's acceleration operation and generation of deceleration force with the brake, thus suppressing the vehicle driving force, the driving force suppression determination unit adds, to a determination condition of the driving force suppression, a condition that an acceleration pedal depression speed by a driver is equal to or more than a threshold value made into a pattern in accordance with an acceleration pedal depression amount, and in a case where, when the vehicle starts, an object which is an obstacle to driving is detected in front of the vehicle and the transmission position is the reverse position and the vehicle is on a road surface descending to a front side, then the driving force suppression determination unit sets the threshold value at a higher level as an inclination of the slope of the road surface descending to the front side increases, and makes the determination as to whether to suppress the driving force or not.

4. A vehicle driving force suppression device comprising:
an object detection unit for detecting an object existing in front of or at back of a vehicle;
a shift position detection unit for detecting a transmission position;
a driving force suppression determination unit for determining whether to suppress a vehicle driving force, on the basis of a detection result of the object given by the object detection unit and a detection result of the transmission position given by the shift position detection unit; and
a driving force suppression unit for suppressing the vehicle driving force by adjusting at least one of a brake and an engine output, wherein
upon a vehicle starting off, if the object detection unit does not detect any object which is an obstacle to driving and which is in front of the vehicle and the shift position detection unit detects that the transmission position is a reverse position, or if the object detection unit does not detect any object which is an obstacle to driving and which is at the back of the vehicle and the shift position detection unit detects that the transmission position is a forward position, the driving force suppression determination unit determines to suppress the vehicle driving force and outputs a command of driving force suppression to the driving force suppression unit,
the driving force suppression unit receives the command from the driving force suppression determination unit, and executes at least one of restriction of the engine output against the driver's acceleration operation and generation of deceleration force with the brake, thus suppressing the vehicle driving force,
the driving force suppression determination unit adds, to a determination condition of the driving force suppression, a condition that an acceleration pedal depression speed by a driver is equal to or more than a threshold value made into a pattern in accordance with an acceleration pedal depression amount, and in a case where, when the vehicle starts, an object which is an obstacle to driving is detected at the rear of the vehicle and the transmission position is the forward position and the vehicle is on a road surface ascending to a front side, then the driving force suppression determination unit sets the threshold value at a higher level as an inclination of the slope of the road surface ascending to the front side increases, and makes the determination as to whether to suppress the driving force or not.

5. The vehicle driving force suppression device according to claim 3, wherein the threshold value is set at a higher value as a distance between the vehicle and the object is closer, and a determination is made as to whether to suppress the driving force or not.

6. The vehicle driving force suppression device according to claim 4, wherein the threshold value is set at a higher value as a distance between the vehicle and the object is closer, and a determination is made as to whether to suppress the driving force or not.

7. A vehicle driving force suppression device comprising:
an object detection unit for detecting an object existing in front of or at back of a vehicle;
a shift position detection unit for detecting a transmission position;
a driving force suppression determination unit for determining whether to suppress a vehicle driving force, on the basis of a detection result of the object given by the object detection unit and a detection result of the transmission position given by the shift position detection unit; and
a driving force suppression unit for suppressing the vehicle driving force by adjusting at least one of a brake and an engine output, wherein
upon a vehicle starting off, if the object detection unit does not detect any object which is an obstacle to driving and which is in front of the vehicle and the shift position detection unit detects that the transmission position is a reverse position, or if the object detection unit does not detect any object which is an obstacle to driving and which is at the back of the vehicle and the shift position detection unit detects that the transmission position is a forward position, the driving force suppression determination unit determines to suppress the vehicle driving force and outputs a command of driving force suppression to the driving force suppression unit,
the driving force suppression unit receives the command from the driving force suppression determination unit, and executes at least one of restriction of the engine output against the driver's acceleration operation and generation of deceleration force with the brake, thus suppressing the vehicle driving force,
the driving force suppression determination unit adds, to a determination condition of the driving force suppression, a condition that an acceleration pedal depression speed by a driver is equal to or more than a threshold value made into a pattern in accordance with an acceleration pedal depression amount, and
when a structure extending to a front side or a rear side along a side of the vehicle is detected, and a steering wheel angle is equal to or more than a certain value, then the threshold value is set at a low level as compared with a case where the steering wheel angle is less than the certain value, and a determination is made as to whether to suppress the driving force or not.

8. A vehicle driving force suppression device comprising:
an object detection unit for detecting an object existing only at back of a vehicle;
a shift position detection unit for detecting a transmission position;
a driving force suppression determination unit for determining whether to suppress a vehicle driving force, on the basis of a detection result of the object given by the object detection unit and a detection result of the transmission position given by the shift position detection unit; and
a driving force suppression unit for suppressing the vehicle driving force by adjusting at least one of a brake and an engine output,
wherein, upon a vehicle starting off, if the object detection unit does not detect any object which is an obstacle to driving and which is at the back of the vehicle and the shift position detection unit detects that the transmission position is a forward position, the driving force suppression determination unit determines to suppress the vehicle driving force and outputs a command of driving force suppression to the driving force suppression unit; and
wherein the driving force suppression unit receives the command from the driving force suppression determination unit, and executes at least one of restriction of the engine output against the driver's acceleration operation and generation of deceleration force with the brake, thus suppressing the vehicle driving force.

* * * * *